United States Patent
Hollender et al.

(10) Patent No.: US 10,824,963 B2
(45) Date of Patent: Nov. 3, 2020

(54) ALARM HANDLING SYSTEM AND METHOD IN PLANT PROCESS AUTOMATION

(71) Applicant: ABB Schweiz AG, Baden (CH)

(72) Inventors: Martin Hollender, Dossenheim (DE); Benjamin Kloepper, Mannheim (DE); Moncef Chioua, Heidelberg (DE)

(73) Assignee: ABB SCHWEIZ AG, Baden (CH)

( * ) Notice: Subject to any disclaimer, the term of this patent is extended or adjusted under 35 U.S.C. 154(b) by 62 days.

(21) Appl. No.: 16/178,629

(22) Filed: Nov. 2, 2018

(65) Prior Publication Data

US 2019/0073609 A1 Mar. 7, 2019

Related U.S. Application Data

(63) Continuation of application No. PCT/EP2017/060651, filed on May 4, 2017.

(30) Foreign Application Priority Data

May 4, 2016 (EP) .................................. 16168327

(51) Int. Cl.
*G08B 21/00* (2006.01)
*G06N 20/00* (2019.01)
*G05B 23/02* (2006.01)
*G05B 19/418* (2006.01)

(52) U.S. Cl.
CPC ....... *G06N 20/00* (2019.01); *G05B 19/41885* (2013.01); *G05B 23/0232* (2013.01); *G05B 2219/34457* (2013.01)

(58) Field of Classification Search
CPC .... G05B 19/41885; G05B 2219/34457; G05B 23/0232; G06N 20/00
USPC .......................................................... 340/500
See application file for complete search history.

(56) References Cited

U.S. PATENT DOCUMENTS

| | | | | |
|---|---|---|---|---|
| 6,453,207 | B1* | 9/2002 | Holmes | G05B 15/02 700/108 |
| 2005/0240382 | A1* | 10/2005 | Nakaya | G05B 17/02 703/6 |
| 2010/0241901 | A1* | 9/2010 | Jahn | G05B 19/41885 714/26 |

(Continued)

FOREIGN PATENT DOCUMENTS

WO WO 03081183 A1 10/2003

*Primary Examiner* — Mark S Rushing
(74) *Attorney, Agent, or Firm* — Leydig, Voit & Mayer, Ltd.

(57) ABSTRACT

An alarm handling system in plant process automation with a data processing device includes: at least one interface for accessing and/or processing one or more process signals and for determining corresponding process variables; an alarm configuration device for accessing and/or providing alarm configuration information including at least one setpoint for one or more determined process variables; and a prediction device for determining and processing a current rate of change of at least one process variable to predict how long it will take and/or a period until and/or predict at which date and/or time a provided setpoint and/or threshold is reached and/or crossed, and/or for determining whether and/or when at least one of the monitored and/or determined process variable values will cross the respective setpoint.

20 Claims, 4 Drawing Sheets

(56) References Cited

U.S. PATENT DOCUMENTS

| | | | |
|---|---|---|---|
| 2012/0310413 A1* | 12/2012 | Bluck | C12C 13/00 700/266 |
| 2013/0191106 A1* | 7/2013 | Kephart | G06F 30/20 703/21 |
| 2015/0316901 A1* | 11/2015 | Wenzel | G06Q 50/06 700/291 |
| 2016/0042541 A1* | 2/2016 | Nixon | G05B 23/0232 715/771 |
| 2016/0098647 A1* | 4/2016 | Nixon | G06N 20/00 700/47 |
| 2016/0330225 A1* | 11/2016 | Kroyzer | G06F 21/552 |

* cited by examiner

Table of consequences

| Health | Environmental | Financial |
|---|---|---|
| Loss of life | >50bbls release | >$5MM |
| DAFWC | 50bbls release | $500K to $5MM |
| First aid case | 1 tonne spillage | >$500K |
| Unlikely to cause injury | Negligible | none |

Priority determination matrix

| | Immediate 0-3min | Prompt 3-10min | Soon 10-30min | No action |
|---|---|---|---|---|
| | Emerge. | Emerge. | High | No alarm |
| | High | High | Low | No alarm |
| | Low | Low | Low | No alarm |
| | No alarm | No alarm | No alarm | No alarm |

Fig.4

| Time-Stamp | Status | ID | Message | Ack | Trend |
|---|---|---|---|---|---|
| 10:03:27 | Critical | P123 | Pressure High | | Trip in 5 Minutes ↑ |
| 10:01:54 | Normal | T123 | Temperature High | ✓ | RTN in 5 Minutes ↓ |
| 09:58:15 | Critical | P234 | Pressure High | | Trip in 30 Minutes ↗ |
| 09:57:30 | Critical | F123 | Flow High | ✓ | ESD in >60 Minutes → |
| 09:55:45 | Low | P101 | Pressure High | ✓ | Trip in 3 Minutes ↑ |
| 09:53:27 | Normal | T567 | Temperature High | | Trip in >60 Minutes → |

Fig.5

ALARM HANDLING SYSTEM AND METHOD IN PLANT PROCESS AUTOMATION

CROSS-REFERENCE TO PRIOR APPLICATION

This application is a continuation of International Patent Application No. PCT/EP2017/060651, filed on May 4, 2017, which claims priority to European Patent Application No. EP 16168327.1, filed on May 4, 2016. The entire disclosure of both applications is hereby incorporated by reference herein.

FIELD

The invention relates to an alarm handling system and an alarm handling method in plant process automation and/or process automation technology for process plant facilities, like for example in food and beverage industry, oil and gas industry, chemical and pharmaceutical industry.

BACKGROUND

Today in plant process automation alarm setpoints are calculated or determined assuming a worst case scenario with regard to the alternation rate for a process variable, like for example if in a tank reaching a level L(trip) causes an automatic shutdown action, e.g. stop all inflow, the alarm setpoint L(alarm) is calculated in such a way that even with maximum speed of increase (maximum alternation rate) of the level and/or the respective process variable, so that the operator still has enough time to avoid the trip. This situation is disclosed in FIG. 1 which is taken from I EC 62682 disclosing the common alarm handling situation in plant process automation.

Disadvantageously, even in case if the rate of change is lower than the maximum alternation rate of the respective process variable and accordingly the rate of change of a respective level is lower than the worst case scenario, wherein the alarm setpoint could be much closer to the consequence threshold still giving the operator sufficient time to react, the present or real rate of change is not taken into account and the once defined alarm setpoint may not be adapted.

Thus, today there is no dynamic feedback adaption of alarm setpoints in plant process automation, and accordingly a more realistic and more efficient assessment and handling of alarms in process plant automation and/or accordingly a more precise assessment of alarms is not available and/or not possible.

SUMMARY

In an embodiment, the present invention provides an alarm handling system in plant process automation with a data processing device, comprising: at least one interface configured to access and/or process one or more process signals and to determine corresponding process variables; an alarm configuration device configured to access and/or provide alarm configuration information comprising at least one setpoint for one or more determined process variables; and a prediction device configured to determine and process a current rate of change of at least one process variable to predict how long it will take and/or a period until and/or predict at which date and/or time a provided setpoint and/or threshold is reached and/or crossed, and/or to determine whether and/or when at least one of the monitored and/or determined process variable values will cross the respective setpoint.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
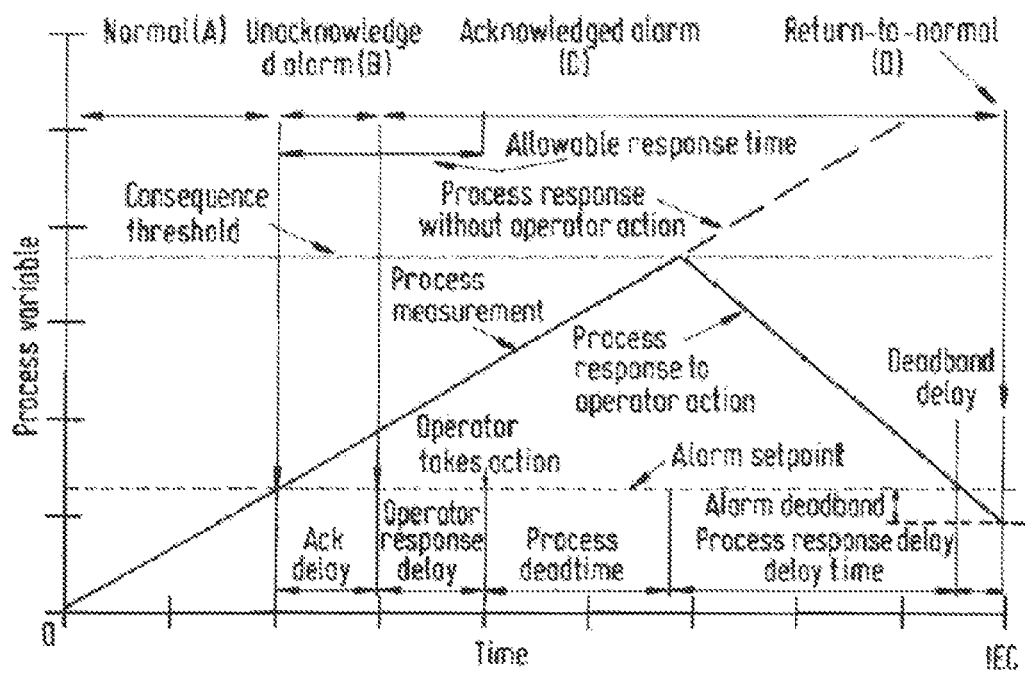
FIG. 1 alarm handling according to the state of the art

Thus an object of the invention is to provide a more realistic and efficient alarm handling possibility in plant process automation.

The alarm handling system in plant process automation according to the invention comprises a data processing device comprising at least one interface, accessing and/or processing one or more process signals and determining corresponding process variable values, an alarm configuration device, accessing and/or providing alarm configuration information comprising at least one setpoint for one or more determined process variables, a prediction device determining and processing the current rate of change of at least one process variable to predict how long it will take and/or the period until and/or predict at which date and/or time a provided setpoint and/or threshold, in particular a predefined setpoint and/or threshold and in particular a consequence threshold, is reached and/or crossed, and/or determines whether and/or when at least one of the monitored and/or determined process variable values will cross the respective setpoint, in particular the alarm setpoint, for example when indicating a return-to-normal scenario.

Accordingly the alarm handling system and in particular the prediction device may provide and ensure a dynamic alarm feedback according to the alternating rate of at least one process variable and a countdown timer and/or trend determination for at least one correlated setpoint or threshold, which means correlated to said at least one process variable.

In a further embodiment the prediction performed by the prediction device is executed on a cyclic and/or periodic basis in a predefined cycle length, in particular every 30 seconds. The cycle length may be predefined and the cycle length or cycle period may be a few seconds to minutes.

In a further embodiment the prediction performed by the prediction device is executed on an event triggered basis, for example when a change of the alternating rate and/or change rate occurs and/or is detected and/or determined.

In a further embodiment the prediction performed by the prediction device is executed by request, in particular by request of an operator.

The prediction can be based on a simple linear interpolation with the current rate of change, but could also be based on more complex prediction models based on historical data, e.g. Hidden Markov Models.

The only additional required configuration parameter is the consequence threshold related to an alarm, which should be available anyhow as it is important for the calculation of the alarm setpoint. If the prediction and indication should be limited to the information if and/or when the alarm will return-to-normal even this additional required configuration parameter can be omitted.

Advantageously the approach according to the invention generates the same alarms as the current state of the art approach and does not add risk or significant complexity but allows a more realistic and efficient handling as well as a more sophisticated assessment of alarms.

Furthermore, the prediction may be performed by applying a regression algorithm to the at least one respective process variable, which means that the time until the next threshold is crossed or the exceeded threshold is crossed again (return to normal) can be estimated by regression, e.g. Polynomial Regression, Gradient Boosting Trees, Stochastic gradient boosting, Artificial Neural Networks/Deep Learning, Gaussian Process, Kernel Regression, or classification, e.g. Decision Trees, Support Vector Machines, Logistics Regression, Naïve Bayes, Random Forrests, Artificial Neural Networks/Deep Learning, or a combination of the two methods regression and classification.

In a further embodiment the prediction may be performed by applying a linear regression algorithm or function to the at least one respective process variable.

In a further embodiment a configuration learner device is provided, wherein alarm configuration information, like for example suitable and/or appropriate process variables, corresponding alarm set point and consequence thresholds are derived and/or determined from historical data, in particular stored on at least one historical database, including for example alarm logs and process measurements.

In a further embodiment a prediction model learner is provided, wherein a prediction model applied and executed that takes the current process signal values as input values which are processed to predict future values and/or a trend for one or more process variable values.

In a further embodiment the processing predictor device is executing and/or performing the prediction taking into account the most recent readings from the signal and predicting future values and checking if and when a cross consequence threshold or alarm set point and threshold respectively is reached and/or crossed.

In a further embodiment an alarm display device is provided, which is presenting alarm messages in list form and which is updated periodically or event triggered.

In a further embodiment the predicted information like duration and/or date and/or time is disclosed and/or shown together with the correlated alarm and/or alarm message.

The operator can use said information to better assess and prioritize which alarm is most critical for the plant and/or which alarm is to act upon first to avoid any damages or disturbances for the respective process.

In a further embodiment the prediction device processes at least one of the following configuration parameters, in particular provided by the alarm configuration device: the alarm limit, the related trip limit, wherein often these are "Hi" and "HiHi" alarms, and the related process signal, which can be shown as an option in the 800×A alarm list already today In a further embodiment in case when even the alarm set points and the related process signal are not readily available, e.g. hard-coded in legacy controllers, historical process measurements and alarm and event logs could be leveraged by a configuration learner device and/or a prediction model learner device to re-engineer the alarm set points in an automated and data driven fashion.

According to another embodiment the alarm handling system means are provided, by which stepwise
  in a first optional step, the alarm configuration information, which comprise signal, alarm set point and consequence threshold, can be derived from historical data, in particular alarm logs and process measurements, performed by the configuration learner device,
  in an optional second step the prediction model is created and/or learned that takes the current signal as input and predicts future values,
  in a third and first mandatory step, the prediction is performed in the simplest case by linear extrapolation taken into account the most recent readings from the signal and predicting future values and checking if and when the cross consequence threshold or alarm set point,
  In the fourth and second mandatory step, the alarm display or list is updated accordingly.

In a further embodiment the fourth step may include the filtering (not displaying) of alarms based on the information provided by the third step (e.g. time until Return-to-Normal or additional information like probability or confidence provided by more complex prediction methods) and/or a fifth optional step might include a periodic recalculation of prediction to update the screen, in particular including displaying alarms previously filtered in the fourth step.

Moreover, the object of the invention is also solved by an alarm handling method described herein.

The alarm handling method in plant process automation according to the invention stepwise comprises
  accessing and/or processing of one or more process signals and determining corresponding process variables and/or process variable values,
  accessing and/or providing alarm configuration information comprising at least one setpoint and/or threshold for one or more determined process variables,
  determining and processing the current rate of change of at least one process variable and predicting how long it will take and/or predicting the period until and/or predicting at which date and/or time a provided setpoint and/or threshold, in particular a predefined setpoint or threshold and in particular a consequence threshold, is reached and/or crossed, and/or determines whether and/or when at least one of the monitored and/or determined process variable values will cross the respective setpoint, in particular the alarm setpoint indicating a return-to-normal scenario.

In a further embodiment the prediction performed is executed and/or performed on a cyclic and/or periodic basis in a predefined cycle length, in particular every 30 seconds. The cycle length may be predefined and the cycle length or period may be a few seconds up to one or more minutes.

In a further embodiment the prediction performed is executed on an event triggered basis, for example in case a change of the alternating rate and/or change rate occurs and/or is detected and/or is determined.

In a further embodiment the prediction is executed by request, in particular by request of an operator.

The prediction can be based on a simple linear interpolation with the current rate of change, but could also be based on more complex prediction models based on historical data, e.g. Hidden Markov Models.

The only additional required configuration parameter is the consequence threshold related to an alarm, which should be available anyhow as it is important for the calculation of the alarm setpoint. If the prediction and indication should be limited to the information if and/or when the alarm will return-to-normal even this additional required configuration parameter can be omitted.

Advantageously the approach according to the invention generates the same alarms as the current state of the art approach and does not add risk or significant complexity but allows a more realistic and efficient handling as well as a more sophisticated assessment of alarms.

Furthermore, the prediction may be performed by applying a regression algorithm to the at least one respective process variable, which means that the time until the next threshold is crossed or the exceeded threshold is crossed again (return to normal) can be estimated by regression, e.g. Polynomial Regression, Gradient Boosting Trees, Stochastic gradient boosting, Artificial Neural Networks/Deep Learning, Gaussian Process, Kernel Regression, or classification, e.g. Decision Trees, Support Vector Machines, Logistics Regression, Naïve Bayes, Random Forrests, Artificial Neural Networks/Deep Learning, or a combination of the two methods regression and classification.

In a further embodiment the prediction may be performed by applying a linear regression algorithm or function to the at least one respective process variable.

In a further embodiment alarm configuration information, like for example suitable and/or appropriate process variables, corresponding alarm set point and consequence thresholds are derived and/or determined from historical data, in particular stored on at least one historical database, including for example alarm logs and process measurements.

In a further embodiment a prediction model is provided or created and/or applied and executed that takes the current process signal values as input values which are processed to predict future values and/or a trend for one or more process variables.

In a further embodiment the prediction takes into account the most recent readings from the signal and predicting future values and checking if and when a cross consequence threshold or alarm set point and threshold respectively is reached and/or crossed.

In a further embodiment alarms and/or alarm messages are displayed in list form and are updated periodically or event triggered.

In a further embodiment the predicted information like duration and/or date and/or time is disclosed and/or shown together with the correlated alarm and/or alarm message.

The operator can use said information to better assess and prioritize which alarm is most critical for the plant and/or which alarm is to act upon first to avoid any damages or disturbances for the respective process.

In a further embodiment at least one of the following configuration parameters, the alarm limit, the related trip limit, wherein often these are "Hi" and "HiHi" alarms, and the related process signal, which can be shown as an option in the 800×A alarm list already today, is processed.

In a further embodiment in case when even the alarm set points and the related process signal are not readily available, e.g. hard-coded in legacy controllers, historical process measurements and alarm and event logs could be leveraged to re-engineer the alarm set points in an automated and data driven fashion.

According to another embodiment the alarm handling method:
in a first optional step, the alarm configuration information, which comprise signal, alarm set point and consequence threshold, can be derived from historical data, in particular alarm logs and process measurements,
in an optional second step the prediction model is created and/or learned that takes the current signal as input and predicts future values,
in a third and first mandatory step, the prediction is performed in the simplest case by linear extrapolation taken into account the most recent readings from the signal and predicting future values and checking if and when the cross consequence threshold or alarm set point,
In the fourth and second mandatory step, the alarm display or list is updated accordingly.

The claimed invention and advantageous embodiments are disclosed and explained in more detail according to several figures and execution examples.

In FIG. 1 a state of the art scenario is presented, wherein in plant process automation alarm setpoints are calculated assuming a worst case scenario with regard to the maximum alternation rate for a process variable, like for example if in a tank reaching a level L(trip) causes an automatic shutdown action, e.g. stop all inflow, the alarm setpoint L(alarm) is calculated in such a way that even with maximum speed of increase (maximum alternation rate) of the level and/or the respective process variable, so that the operator still has enough time to avoid the trip. This situation is taken from IEC 62682. Accordingly in FIG. 1 all the possible elements related to an implementation of an alarm handling system are disclosed. FIG. 1 shows a diagram wherein the y-axis refers to a process variable and the x-axis to the time. For the exemplary process variable an alarm setpoint and a consequence threshold are defined. When the measures process variable value reaches and/or crosses the alarm setpoint am alarm is generated. According to known systems and methods on the basis of a maximum alternation rate of said process values periods and instances of time are determined defining the allowable response time, process dead time, time when the process variable crosses the consequence threshold, process response delay delay time and deadband delay, when the process variable returns to normal values and normal scenario.

Disadvantageously in most cases the measured alternating rate differs from the defined maximum alternating rate thus the calculated and/or determined instances of time are overly pessimistic and/or not correct.

Assuming that not solely one specific process variable and alarm has to be handled but at least from ten up to several hundred alarms have to be handled this may lead to an incorrect and faulty ranking of said alarms, which may lead to misdiagnoses and finally dysfunction of the whole plant or facility.

Figure 2:
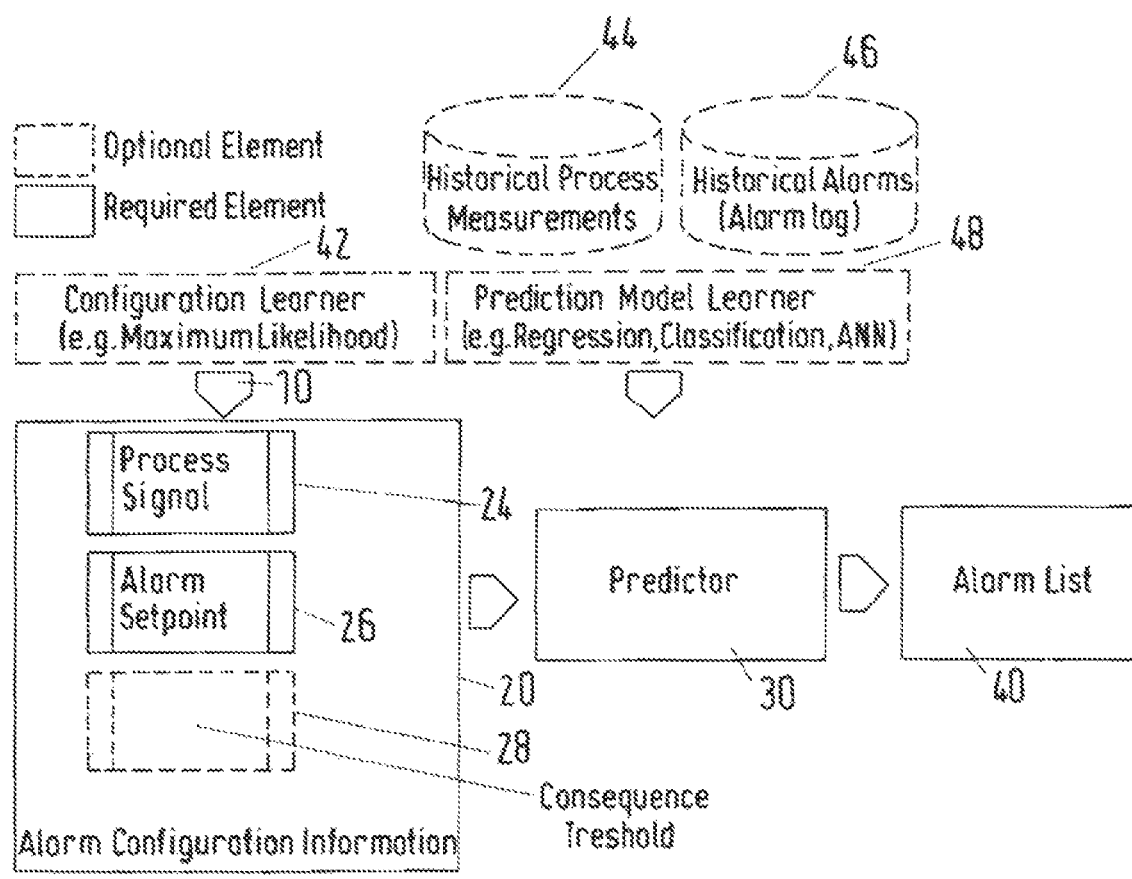
FIG. 2 schematic presentation of an exemplary alarm handling system according to the invention FIG. 3 schematic presentation of an exemplary alarm handling method according to the invention FIG. 4 prioritization matrix for alarms FIG. 5 exemplary alarm list including predicted trends

In FIG. 2 an alarm handling system for a plant process automation facility according to the invention is presented comprising a data processing device with at least one interface, accessing and/or processing one or more process signals and determining corresponding process variable values.

Furthermore, an alarm configuration device 20 is provided accessing and/or providing alarm configuration information comprising at least one setpoint 26 for one or more determined process variables 24. A prediction device 30 is provided determining and processing the current rate of change of at least one process variable to predict how long it will take and/or the period until and/or predict at which date and/or time a provided setpoint and/or threshold, in particular a predefined setpoint and/or threshold and in particular a consequence threshold 28, is reached and/or crossed, and/or determines whether and/or when at least one of the monitored and/or determined process variable values 24 will cross the respective setpoint 26, in particular the alarm setpoint 26, for example indicating a return-to-normal scenario.

The prediction process performed by the prediction device may be executed on a cyclic and/or periodic basis in a predefined cycle length, in particular every 30 seconds. The cycle length may be predefined and the cycle length or period may be from a few seconds to minutes.

Furthermore, alternatively or in combination the prediction may be executed on an event triggered basis, for example an alarm, a change of the alternating rate and/or change rate of the respective process variable, in particular of temperature, pressure, or flow, occurs and/or is detected and/or determined, and/or by request.

The prediction can be based on a simple linear interpolation with the current rate of change, but could also be based on more complex prediction models based on historical data, e.g. Hidden Markov Models.

Advantageously, the approach according to the invention generates the same alarms as the current state of the art approach and does not add risk or significant complexity but allows a more realistic and efficient handling as well as a more sophisticated assessment of alarms.

Furthermore, the prediction may be performed by applying a regression algorithm to the at least one respective process variable, which means that the time until the next threshold is crossed or the exceeded threshold is crossed again (return to normal) can be estimated by regression, e.g. Polynomial Regression, Gradient Boosting Trees, Stochastic gradient boosting, Artificial Neural Networks/Deep Learning, Gaussian Process, Kernel Regression, or classification, e.g. Decision Trees, Support Vector Machines, Logistics Regression, Naïve Bayes, Random Forrests, Artificial Neural Networks/Deep Learning, or a combination of the two methods regression and classification.

Moreover, a configuration learner device 42 is provided, wherein alarm configuration information, like for example suitable and/or appropriate process variables, corresponding alarm setpoints and consequence thresholds are derived and/or determined from historical data, in particular stored on at least one historical database 44,46, including for example alarm logs and process measurements.

Additionally, a prediction model learner 48 may be provided, wherein a prediction model is applied and executed that takes the current process signal values as input values which are processed to predicts future values and/or a trend for one or more process variable values.

Thus, in case when even the alarm set points and the related process signal are not readily available, e.g. hardcoded in legacy controllers, historical process measurements and alarm and event logs can be leveraged by the configuration learner device 42 and/or a prediction model learner device 46 to re-engineer the alarm set points 26 in an automated and data driven fashion.

The predictor device 30 is executing and/or performing the prediction taking into account the most recent readings from the signal and predicting future values and checking if and when a cross consequence threshold or alarm set point and threshold respectively is reached and/or crossed.

An alarm display device 40 is provided, which is presenting alarm messages in list form comprising trend indicators for specific process variables and alarms and/or setpoints, wherein the presentation and the respective alarm information is updated, wherein the predicted information like duration and/or date and/or time is disclosed and/or shown together with the correlated alarm and/or alarm message, as disclosed in FIG. 5, periodically and/or event triggered and/or by request. Also a prioritization matrix, as disclosed in FIG. 4, may be provided and presented.

The operator can use said information to better assess and prioritize which alarm is most critical for the plant and/or which alarm is to act upon first to avoid any damages or disturbances for the respective process.

Figure 3:
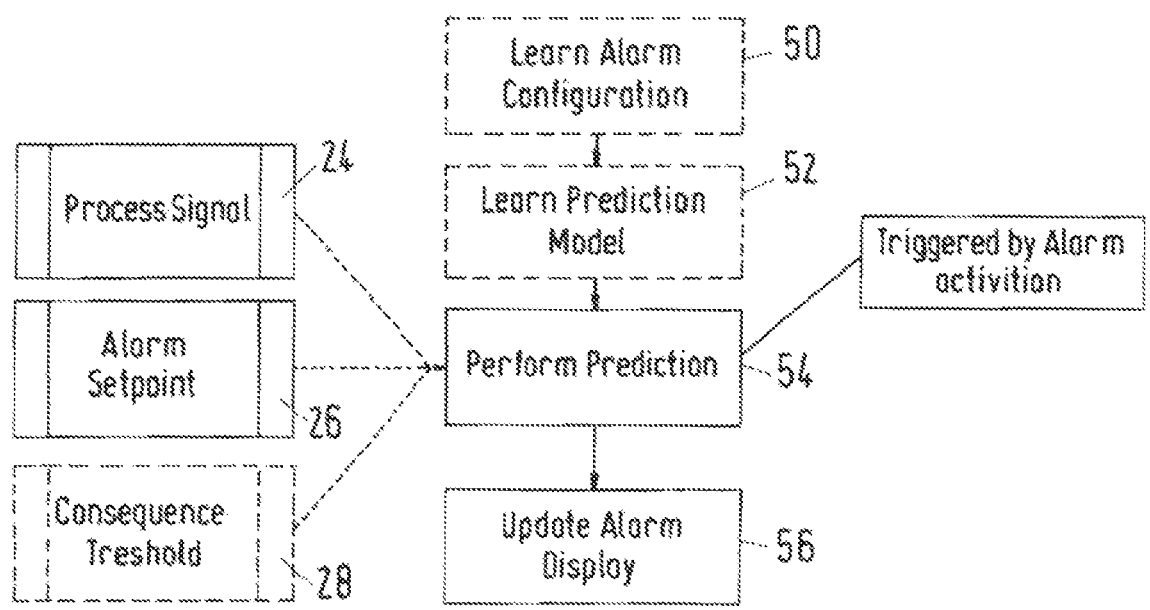

In FIG. 3 a schematic presentation of an exemplary embodiment of the alarm handling method according to the invention is disclosed alarm handling system means are provided, by which stepwise in a first optional step 50, the alarm configuration information, which comprise signal, alarm set point and consequence threshold, can be derived from historical data, in particular alarm logs and process measurements, in particular performed by the configuration learner device 42, in an optional second step 52 the prediction model is created and/or learned that takes the current signal as input and predicts future values, in a third and first mandatory step 54, the prediction is performed in the simplest case by linear extrapolation taken into account the most recent readings from the signal 24 and predicting future values and checking if and when the respective consequence threshold 28 or alarm set point 26 is reached and/or crossed, wherein the prediction firstly may be triggered by alarm activation In the fourth and second mandatory step 56, the alarm display or list is updated accordingly. The prediction process performed by the prediction device may be executed on a cyclic and/or periodic basis in a predefined cycle length, in particular every 30 seconds. The cycle length may be predefined and the cycle length or period may be from a few seconds to minutes.

Furthermore, alternatively or in combination the prediction may be executed on an event triggered basis, for example an alarm, a change of the alternating rate and/or change rate of the respective process variable, in particular of temperature, pressure, or flow, occurs and/or is detected and/or determined, and/or by request.

For example, in case of a high filling level alarm:
Supposing that a container must not overflow in any case, the filling height is calculated in such a way for the triggering of the alarm that at a maximum filling speed the operator disposes of a certain minimum response time, e.g. three minutes. The required response time is usually covered by the alarm priority, e.g. priority "red" (high) because a quick reaction is necessary and the potential damage quite high. If the alarm is triggered, the assigned priority is based on the highest assumed filling speed. The actual filling speed however may be much lower in that specific case, insofar the indicated priority is considered "wrong" It is important to know that from the alarm it cannot be deduced what may be the possible time period until the overflow happens, which however is very important for the operator. In the simplest case it could be evaluated as follows: t(overflow)=h(current distance from the edge)/v(current filling speed). It would also be interesting to indicate this time in the alarm.

If the plant operator needs to decide on which of the two alarms of equal priority should be handled first, the invention actually helps to identify the more "acute" alarm.

In FIG. 4 an exemplary prioritization matrix for alarm assessment and handling is presented. It shows the current state of the art how static off-line configuration of alarm priority is currently done. The table of consequences on the left shows an example how four different levels of potential damage can be defined. The first row shows the most severe potential consequences in case the operator does not react to the alarm. In this example this means either that at least one person will die, or that more than fifty barrel of crude oil will be released into the ocean or that a financial damage bigger than five million euro will occur. In addition to these four levels of severity, the matrix on the right introduces three time ranges in which the operator has to react (immediate, prompt, soon). The matrix determines the priority for the operator: for example an alarm requiring immediate response and most severe potential consequences gets the priority "emergency". If such an alarm occurs, the operators know that they should focus on this alarm first.

In FIG. 5 an exemplary list of alarm messages is disclosed comprising predicted trends and time schedules for the respective setpoint and/or threshold for several alarms and/ or alarm messages referring to different measured process temperature and pressure variables, in particular of sensors of different technical equipment installed in the plant. The difficult question for the operator is which alarm to handle first. In this case there are three alarms with priority "critical" which usually means that these alarms need immediate response and that a severe damage can occur if no action is taken. The additional information from this invention shows that "p123" is rapidly rising and that a trip is predicted in five minutes, whereas for the other two critical alarms more time is predicted (30 minutes and more than 60 minutes) It is rather obvious that the operator should focus on "p123" first. In a conventional system there would be no easy way to know on which of the three critical alarms to focus first.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An alarm handling system in plant process automation with a data processing device, comprising:
    at least one interface configured to access and/or process one or more process signals and to determine corresponding process variables;
    an alarm configuration device configured to access and/or provide alarm configuration information comprising at least one setpoint for one or more determined process variables; and
    a prediction device providing dynamic alarm feedback, the prediction device being configured to determine and process a current rate of change of at least one process variable to predict how long it will take and/or a period until and/or predict at which date and/or time a provided setpoint and/or threshold is reached and/or crossed, and/or to determine whether and/or when at least one of the monitored and/or determined process variable values will cross the respective setpoint and/or threshold, so as to provide the dynamic alarm feedback according to an alternating rate of the at least one process variable and a countdown timer and/or trend determination for the respective setpoint and/or threshold.

2. The alarm handling system according to claim 1, wherein the prediction performed by the prediction device is executed on a cyclic and/or periodic basis in a predefined cycle length and/or wherein the cycle length may freely be defined.

3. The alarm handling system according to claim 1, wherein the prediction performed by the prediction device is executed on an event triggered basis.

4. The alarm handling system according to claim 1, further comprising a configuration learner device,
    wherein alarm configuration information corresponding to alarm set point and consequence thresholds are derived and/or determined from historical data.

5. The alarm handling system according to claim 1, further comprising a prediction model learner,
    wherein a prediction model is applied and executed that takes the current process signal values as input values which are processed to predict future values and/or a trend for one or more process variable values.

6. The alarm handling system according to claim 1, further comprising an alarm display device, which is configured to present alarm messages in list form and which is updated periodically or event triggered, and
    wherein the predicted information is disclosed and/or shown together with the correlated alarm and/or alarm message.

7. An alarm handling method in plant process automation, comprising the steps of:
    accessing and/or processing of one or more process signals and determining corresponding process variables and/or process variable values;
    accessing and/or providing alarm configuration information comprising at least one setpoint and/or threshold for one or more determined process variables; and
    providing dynamic alarm feedback by determining and processing a current rate of change of at least one process variable and predicting how long it will take and/or predicting the period until and/or predicting at which date and/or time a provided setpoint and/or threshold is reached and/or crossed, and/or determining whether and/or when at least one of the monitored and/or determined process variable values will cross the respective setpoint and/or threshold, so as to provide the dynamic alarm feedback according to an alternating rate of the at least one process variable and a countdown timer and/or trend determination for the respective setpoint and/or threshold.

8. The alarm handling method according to claim 7, wherein the prediction performed is executed and/or performed on a cyclic and/or periodic basis in a predefined cycle length, and
wherein the cycle length may freely be defined and/or the cycle length or period may extend from a few seconds up to one or more minutes.

9. The alarm handling method according to claim 7, wherein the prediction performed is executed on an event triggered basis and/or by request.

10. The alarm handling method according to claim 7, wherein prediction is based on a simple linear interpolation with the current rate of change or based on complex prediction models based on historical data, and/or the prediction may be performed by applying a regression algorithm to the at least one respective process variable, such that a time until the next threshold is crossed or the exceeded threshold is crossed again (return to normal) is estimatable by regression or a combination of two methods regression, and classification or is performed by applying a linear regression algorithm or function to the at least one respective process variable.

11. The alarm handling system according to claim 1, wherein the provided setpoint and/or threshold comprises a predefined setpoint and/or threshold.

12. The alarm handling system according to claim 11, wherein the threshold comprises a consequence threshold.

13. The alarm handling system according to claim 1, wherein the respective setpoint comprises the alarm setpoint.

14. The alarm handling system according to claim 13, wherein the respective setpoint comprises the alarm setpoint when indicating a return-to-normal scenario.

15. The alarm handling system according to claim 2, wherein the predefined cycle length is 30 seconds.

16. The alarm handling system according to claim 2, wherein the cycle length may extend from a few seconds to minutes.

17. The alarm handling system according to claim 3, wherein the event triggered basis comprises when a change of an alternating rate and/or change rate occurs and/or is detected and/or determined.

18. The alarm handling system according to claim 4, wherein derived and/or determined from historical data comprises storing on at least one historical database.

19. The alarm handling system according to claim 18, wherein storing on at least one historical database comprises alarm logs and process measurements.

20. The alarm handling system according to claim 6, wherein the predicted information comprises duration and/or date and/or time.

* * * * *